United States Patent
Heller et al.

[11] Patent Number: 5,900,979
[45] Date of Patent: May 4, 1999

[54] COMPUTER MONITOR HOOD

[76] Inventors: Philip Heller, 216 Coldstream Avenue, Toronto, Canada, M5N 1Y3; David Heller, 41 Ezrat Tora, Jeruselam, Israel

[*] Notice: This patent issued on a continued prosecution application filed under 37 CFR 1.53(d), and is subject to the twenty year patent term provisions of 35 U.S.C. 154(a)(2).

[21] Appl. No.: 08/774,013

[22] Filed: Dec. 26, 1996

Related U.S. Application Data

[63] Continuation-in-part of application No. 08/488,908, Jun. 9, 1995, Pat. No. 5,589,985.

[51] Int. Cl.[6] ................................................. G02B 27/00
[52] U.S. Cl. ................................... 359/609; 359/601
[58] Field of Search ............................... 359/601–612, 359/808, 819; 348/834, 842; 361/684–686, 729; 267/26, 100–104, 110–113, 115–158, 275; 312/319.1, 319.2; 24/457, 535, 541; 248/289.31, 292.11, 292.13

[56] References Cited

U.S. PATENT DOCUMENTS

| | | | |
|---|---|---|---|
| 3,062,917 | 11/1962 | Rose | 348/842 |
| 3,606,525 | 9/1971 | Landree | 267/155 |
| 4,444,465 | 4/1984 | Giulie et al. | 359/601 |
| 4,569,572 | 2/1986 | Kopich | 359/601 |
| 4,784,468 | 11/1988 | Tierney | 359/601 |
| 4,865,420 | 9/1989 | Schmidt | 359/601 |
| 5,069,529 | 12/1991 | Takahashi | 359/601 |
| 5,101,298 | 3/1992 | Lentz et al. | 359/612 |
| 5,121,253 | 6/1992 | Waintroob | 359/601 |
| 5,233,468 | 8/1993 | McNulty | 359/601 |
| 5,237,453 | 8/1993 | Jones | 359/601 |
| 5,243,463 | 9/1993 | Waintroob | 359/601 |
| 5,548,350 | 8/1996 | Yamada et al. | 348/839 |

FOREIGN PATENT DOCUMENTS

| | | |
|---|---|---|
| 9416117 | 12/1994 | Germany . |
| 29510898 | 11/1995 | Germany . |
| 2284733 | 6/1995 | United Kingdom . |

*Primary Examiner*—Thong Nguyen
*Attorney, Agent, or Firm*—Donald E. Hewson

[57] ABSTRACT

A computer monitor hood comprises top, left side and right side shading panels each having an outwardly facing surface, a monitor facing surface, front, rear, left and right side edges. A counterweight receiving portion is disposed on the computer monitor and has a first slip-resistant surface. A counterweight having a second slip-resistant surface is selectively manually placeable in any one of a plurality of front-to-rear positions on the counterweight receiving portion, with the first and second slip-resistant surfaces being in cooperating engagement one with the other so as to retain the counterweight in any selected position, thereby balancing the computer monitor hood at a selected position on the computer monitor such that the top, left side, and right side shading panels each project forwardly from the front of the computer monitor, at the respective of the top, left side, and right side surfaces of the computer monitor, so as to shade the screen of the computer monitor. In another embodiment, the top shading panel includes a substantially rigid external layer, and a compliant layer of easily displaceable material disposed on the top shading panel opposite the outwardly facing surface, which compliant layer conforms to the shape of the contacted portion of the monitor, thereby receiving the monitor in seated relation, thus keeping the monitor hood in place. In yet another embodiment, a elastic member or a spring member biases the left and right shading panels into frictional contact with said left and right side surfaces of the monitor.

1 Claim, 12 Drawing Sheets

COMPUTER MONITOR HOOD

CROSS REFERENCE

This application is a Continuation-In-Part of application Ser. No. 08/488,908 filed Jun. 9, 1995, now U.S. Pat. No. 5,589,985.

FIELD OF THE INVENTION

This invention relates to computer monitor hoods for shading the screen of a computer monitor from ambient light. More particularly, this invention relates to computer monitor hoods which are not attached or fixed to the monitor; but whose placement and/or balance, when in place on a computer monitor, can be adjusted.

BACKGROUND OF THE INVENTION

It is common in offices, and other environments where computers are used, to have reasonably intense light from overhead lighting fixtures and windows, in order to sufficiently illuminate an office. Due to the intensity of this light, and also due to the location of overhead lighting fixtures and windows, the light is often perceived as glare on a computer monitor screen. This glare can make it difficult, if not impossible, to see the computer monitor screen properly. It is, therefore, necessary to preclude as much of this light as possible from reaching the computer monitor screen in such a manner that it is reflected off the screen as glare.

In many instances, it may be possible to close curtains or blinds over a window in order to block much of the glare-causing emanating from a window; however, this reduces the amount of ambient light in the room, which might be unacceptable. It is generally not possible to block out the light from overhead lighting fixtures, but it is possible to turn off the overhead lights. However, even this step is often unacceptable.

DESCRIPTION OF THE PRIOR ART

U.S. Pat. No. 5,121,253 to WAINTROOB discloses a visor for a computer monitor wherein the visor has a left wall, a right wall, and a top wall, and the visor is attached to a computer monitor by means of VELCRO™ or other hook and loop two-part fastening devices, which is highly disadvantageous, as it requires permanent attachment of one portion of the VELCRO™ to the computer monitor. The position of the visor on a computer monitor is only very slightly adjustable, depending on the width of the VELCRO™, or on the amount of VELCRO™ used, which is also disadvantageous, since it is necessary to be able to adjust a visor in order to properly shield the computer monitor screen from glare. It is also important to be able to permit proper placement on a variety of computer monitors, which is not readily achievable by WAINTROOB. Particularly, it is highly desirable to be able to angularly adjust the visor by tilting the visor downwardly at its front such that the front edge of the visor is lower than the top edge of the computer monitor. Such angular adjustment of the visor is not taught in the WAINTROOB patent.

U.S. Pat. No. 5,243,463, also to WAINTROOB, is a Continuation-In-Part of the earlier patent, having all of the same disadvantageous features.

U.S. Pat. No. 5,233,468 to McNULTY discloses a computer hood that also has a left wall, a right wall, and a top wall. This computer hood attaches to a computer monitor by means of a retaining device in the form of a pair of clips extends outwardly at right angles to each of the left and right side walls at the bottom thereof, such that each clip engages a lower front portion of the front of the monitor. Additionally, a back wall catches a rear-facing surface of the monitor, so as to keep the visor in place. The position of the visor on a computer monitor, including the angular orientation, is not adjustable in terms of position, which is greatly disadvantageous, as discussed above.

U.S. Pat. No. 5,237,453 to JONES discloses a light absorbing visor for video display monitors, wherein a thin flexible sheet of plastic such as polyvinylchloride is curved and otherwise shaped to conform to the two sides and top of a computer monitor. The visor is secured to the monitor by means of an adhesive strip on the visor, or alternatively by VELCRO™, and is therefore not adjustable in terms of positioning. It is not taught in the Jones patent to angularly adjust the visor on the monitor.

OBJECTS OF THE INVENTION

It is an object of the present invention to provide a computer monitor hood that is placeable on a computer monitor without being attached to the computer monitor.

It is another object of the present invention to provide a computer monitor hood that is readily adjustable in terms of fore-aft and angular placement on a computer monitor.

SUMMARY OF THE INVENTION

In accordance with one aspect of the present invention, there is provided a computer monitor hood for use in conjunction with a computer monitor having a top surface, left and right side surfaces, and a forwardly facing screen. The computer monitor hood comprises a top shading panel having a front edge, a rear edge, left and right side edges, an outwardly facing surface, and a monitor facing surface. Left and right side shading panels each have an outwardly facing surface, a monitor facing surface, front, rear, top and bottom edges, and are operatively attached at their respective top edges to the top shading panel at the left and right side edges thereof, respectively, so as to depend therefrom. A front-to-rear main axis is generally centrally disposed along the top shading panel. A counterweight receiving portion is disposed on the computer monitor and has a first slip-resistant surface. There is at least one counterweight of weight to balance the computer monitor hood, which counterweight has a second slip-resistant surface. The at least one counterweight is selectively manually placeable in any one of a plurality of front-to-rear positions on the counterweight receiving portion, with the first and second high friction surfaces being in cooperating engagement one with the other so as to retain the counterweight in any selected position, thereby permitting balancing of the computer monitor hood at a selected position on the computer monitor such that the top, left side, and right side shading panels each project forwardly from the front of the computer monitor, at the respective of the top, left side, and right side surfaces of the computer monitor, so as to shade the screen of the computer monitor.

In accordance with another aspect of the present invention, there is provided a computer monitor hood for use in conjunction with a computer monitor having a top surface, left and right side surfaces, and a forwardly facing screen. The computer monitor hood comprises a top shading panel having an outwardly facing surface, a monitor facing surface, front, rear, left and right side edges, and includes a substantially rigid external layer, and a compliant layer of easily displaceable material disposed on the top shading panel adjacent the monitor facing surface. Left and right side shading panels each having an outwardly facing surface, a monitor facing surface, front, rear, top and bottom edges, and being operatively attached at their respective top edges to the top shading panel at the left and right side edges thereof, respectively, so as to depend from the respective side edge thereof. A front-to-rear main axis is generally centrally disposed along the top shading panel. When the computer monitor hood is in place on the computer monitor, a portion of the monitor facing surface of the top shading panel rests on a contacted portion of the top surface of the monitor, and a portion of the compliant layer conforms to the shape of the contacted portion of the monitor and the contacted portion of the monitor is received in seated relation, thereby permitting placement of the computer monitor hood at a selected position on the computer monitor such that the top, left side, and right side shading panels each project forwardly from the front of the computer monitor, at the respective of the top, left side, and right side surfaces of the computer monitor, so as to shade the screen of the computer monitor.

In accordance with yet another aspect of the present invention, there is provided a computer monitor hood for use in conjunction with a computer monitor having a top surface, left and right side surfaces, and a forwardly facing screen. The computer monitor hood comprises a top shading panel having an outwardly facing surface, a monitor facing surface, front, rear, left and right side edges. Left and right side shading panels each have an outwardly facing surface, a monitor facing surface, front, rear, top and bottom edges, and are operatively attached at their respective top edges to the top shading panel at the left and right side edges thereof, respectively, so as to each depend from the respective side edge thereof. A front-to-rear main axis is generally centrally disposed along the top shading panel. A biasing means is operatively connected between the left side shading panel and the right side shading panel so as to bias the left and right shading panels toward each other. When the computer monitor hood is in place on the computer monitor, a portion of the monitor facing surface of the top shading panel rests on a contacted portion of the top surface of the monitor, and the biasing means biases the left and right shading panels into frictional contact with the left and right side surfaces, respectively, thereby permitting placement of the computer monitor hood at a selected position on the computer monitor such that the top, left side, and right side shading panels each project forwardly from the front of the computer monitor, at the respective of the top, left side, and right side surfaces of the computer monitor, so as to shade the screen of the computer monitor.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Embodiments of this invention will now be described by way of example in association with the accompanying drawings in which.

DETAILED DESCRIPTION OF THE PREFERRED EMBODIMENTS

Reference will now be made to FIGS. 1 through 5, which show the first preferred embodiment computer monitor hood 30 of the present invention in place on a computer monitor 20 having a top surface 22, a left side surface 24, a right side surface 26, and a forwardly facing screen 28.

The computer monitor hood 30 comprises a substantially planar top shading panel 32, having a front edge 34, a rear edge 36, left and right side edges 38, 39, an outwardly facing surface 33, and a monitor facing surface 35. In the first preferred embodiment as shown, the left side edge 38 and the right side edge 39 of the top shading panel 32 are parallel one with the other. The top shading panel 32 should be wide enough to span across the width of conventional fifteen inch monitors, or even seventeen inch monitors. Further, the rear portion of the top shading panel 32 may include a screened or perforated portion to permit heat vented from the rear portion of the monitor to pass therethrough. Alternatively, a short spur depending from the top shading panel 32 may be included to prevent the computer monitor hood 30 from becoming angled downwardly at the back when the computer monitor hood 30 is not in use and is pushed toward the rear of the computer monitor 20.

Substantially planar left and right side shading panels 40 and 41 are affixed to the top shading panel 32 so as to depend from the left and right edges 38, 39 thereof, respectively. Preferably, the left and right side shading panels 40 and 41 are disposed in generally vertically oriented relation to the top shading panel 32, so as to be juxtaposed to the respective of the left and right side surfaces 24 and 26 of the computer monitor 20. The left side shading panel 40 has a front edge 42, a rear edge 44, a top edge 46, a bottom edge 48, an outwardly facing surface 56, and a monitor facing surface 58. Similarly, the right side shading panel 41 has a front edge 43, a rear edge 45, a top edge 47, a bottom edge 49, an outwardly facing surface 57, and a monitor facing surface 59. Preferably, the front edges 34, 42, and 43 of the left and right side shading panels 40 and 41 and the top shading panel 32 are co-planar one with the other.

Figures 1, 4, 5:
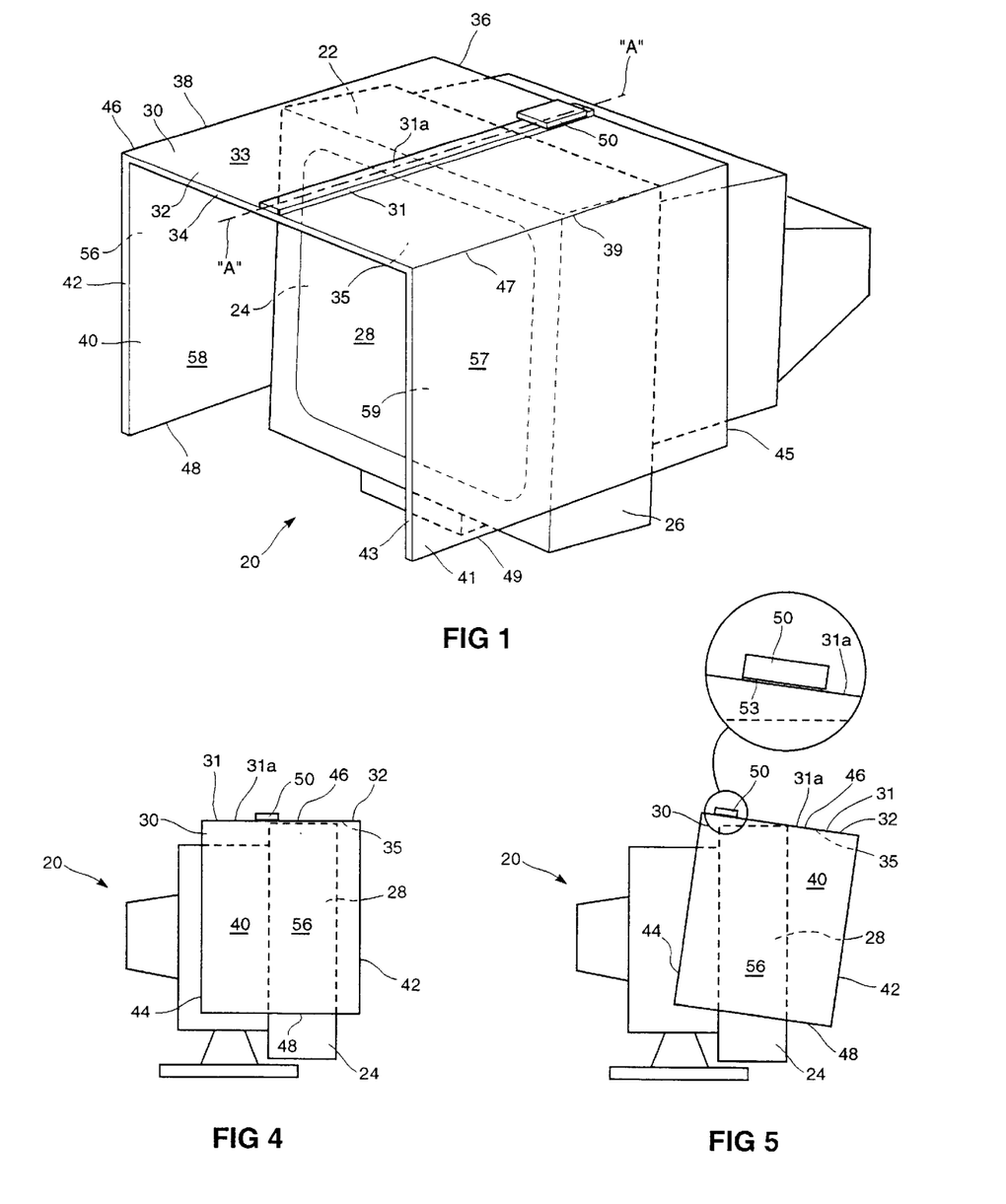
FIG. 1 is a perspective view of a computer monitor with a first preferred embodiment of the computer monitor hood of the present invention in place thereon.
FIG. 4 is a side elevational view of the computer monitor hood of FIG. 1 in place on a computer monitor, with the computer monitor hood projecting slightly outwardly from the front of the computer monitor.
FIG. 5 is a side elevational view of the computer monitor hood of FIG. 1 in place on a computer monitor, with the computer monitor hood projecting significantly outwardly from the front of the computer monitor and angled slightly downwardly.
Figures 2, 3:
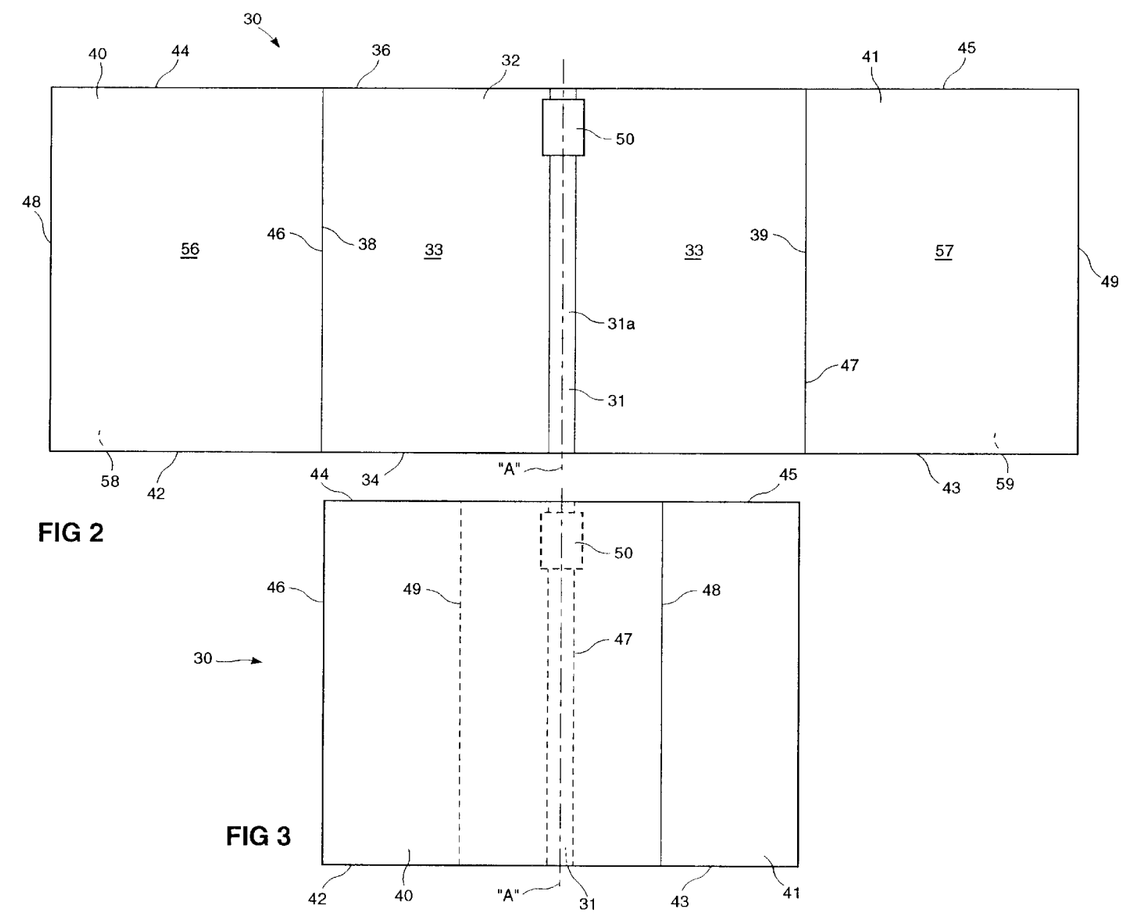
FIG. 2 is a top plan view of the computer monitor hood of FIG. 1 in a flat, open configuration.
FIG. 3 is a top plan view of the computer monitor of FIG. 1 in a folded configuration, adapted for storage or transport.

The computer monitor hood 30 has a front-to-rear main axis "A" oriented in generally parallel relation to the parallel left and right side edges 38 and 39 of the top shading panel.

It is preferable to have a computer monitor hood that may be placed on, or is generally supported by, the computer monitor, without permanent attachment to the computer monitor, and also that is adjustable to fit a variety of computer monitors and also that is adjustable in terms of placement on a computer monitor to provide a suitable amount of shading of the forwardly facing screen of the computer monitor, depending on the position of the overhead lighting.

In the first preferred embodiment, in order to provide such a computer monitor hood 30, a counterweight 50 is selectively manually placeable on the computer monitor hood 30 in any one of a plurality of front-to-rear positions, as will be described in greater detail subsequently, so as to permit the counterweight 50 to balance the computer monitor hood 30 on the computer monitor 20. Proper balancing of the computer monitor hood 30 is important as the computer monitor hood 30 must extend forwardly from the front of the computer monitor 20 so as to shade the forwardly facing screen 28 of the computer monitor 20, which forward extension tends to cause a forward imbalance of the computer monitor hood 30. It is also highly desirable to have the front edge 34 of the top shading panel 32 situated so as to be as low as is needed to provide as much shading as possible for the screen 28. The computer monitor hood 30 is placeable on the computer monitor 20 in angularly adjustable relation so as to permit the front edge 34 to be generally aligned with the top of the screen 28. Such alignment will, of course, be dependent on the specific user sitting in front of the computer monitor 20. The computer monitor hood 30 must therefore be attached or supported in some stable manner, such that it will remain in place during use, when the computer monitor hood 30 is placed slightly forwardly on a computer monitor 20, as shown in FIG. 4, and also when placed more forwardly on a computer monitor 20, as shown in FIG. 5.

In the first preferred embodiment, the counterweight 50 is selectively manually placeable on the computer monitor hood 30 in any one of a plurality of front-to-rear positions on a counterweight receiving portion 31. The counterweight receiving portion 31 is disposed on the outwardly facing surface 33 of the top shading panel 32, and has a first slip-resistant surface 31a thereon, which slip-resistant surface 31a may be made from a high friction material such as natural or synthetic rubber, sponge rubber, or rough cloth material such as felt, among others. The counterweight receiving portion 31 is preferably generally centrally located on the outwardly facing surface 33 of the top shading panel 32 so as to be oriented in a direction generally parallel to the front-to-rear main axis "A".

The counterweight 50 has a second slip-resistant surface 53 disposed thereon, which second slip-resistant surface 53 may also be made from a high friction material such as natural or synthetic rubber, sponge rubber, or rough cloth material such as felt, among others.

When the counterweight 50 is manually placed on the counterweight receiving portion 31, in any one of said plurality of front-to-rear positions, the first slip-resistant surface 31a and second slip-resistant surface 53 are in cooperating engagement one with the other. In this manner, the first 31a and second 53 slip-resistant surfaces retain the counterweight 50 in any selected position. The counterweight 50 may of course be manually moved and placed at any selected one of said plurality of front-to-rear positions, as desired, at any time. Such selective placement of the counterweight 50 to any one of a plurality of front-to-rear positions along the counterweight receiving portion 31 on the top shading panel 32 thereby permits the computer monitor hood 30 to be balanced at a selected position on the computer monitor 20 such that the top shading panel 32, the left side shading panel 40, and the right side shading panel 41 each project forwardly from the front of the computer monitor 20, at the respective of the top surface 22, the left side surface 24, and the right side surface 26. In this manner, the forwardly facing screen 28 of the computer monitor 20 is shaded by the top shading panel 32, the left side shading panel 40, and the right side shading panel 41. Typically, at this selected position, the computer monitor hood 30 is positioned as far forwardly as reasonably possible and is tilted downwardly at the front such the front edge 34 thereof is generally aligned with the top of the screen 28, so as to shade the screen 28 of the computer monitor 20 as much as possible, as balanced by the counterweight 50. It can be seen that the computer monitor hood 30 would not stay in place on the computer monitor 20, in a manner as described above, without the balancing action of the counterweight 50.

In order to help retain the computer monitor hood 30 in place on the computer monitor 20, it is preferable to have the monitor facing surface 35 of the top shading panel 32 be of a soft, high friction material, such as sponge rubber or the like.

In order to provide for easy storage and transportation of the computer monitor hood 30, the left side shading panel 40 and the right side shading panel 41 are foldable outwardly respective in-use shading positions so as to make the computer monitor hood 30 flat, as can be seen in FIG. 2, and are then foldably movable over the top shading panel 32 to respective storage positions, as can be seen in FIG. 3.

Figure 6:
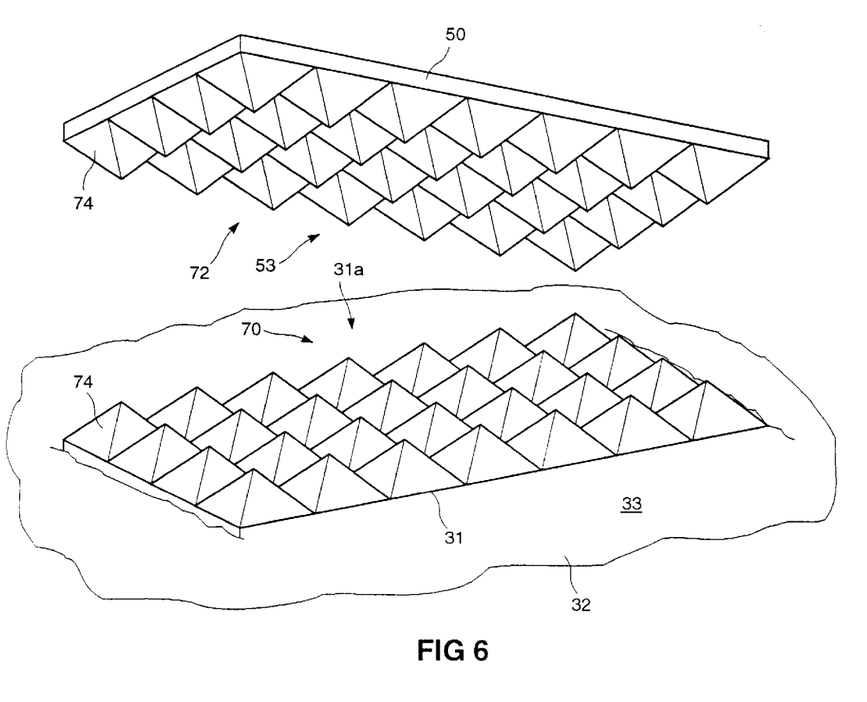
FIG. 6 is a perspective view of a slip resistant surfaces on an alternative embodiment computer monitor hood and counter weight.
Figure 7:
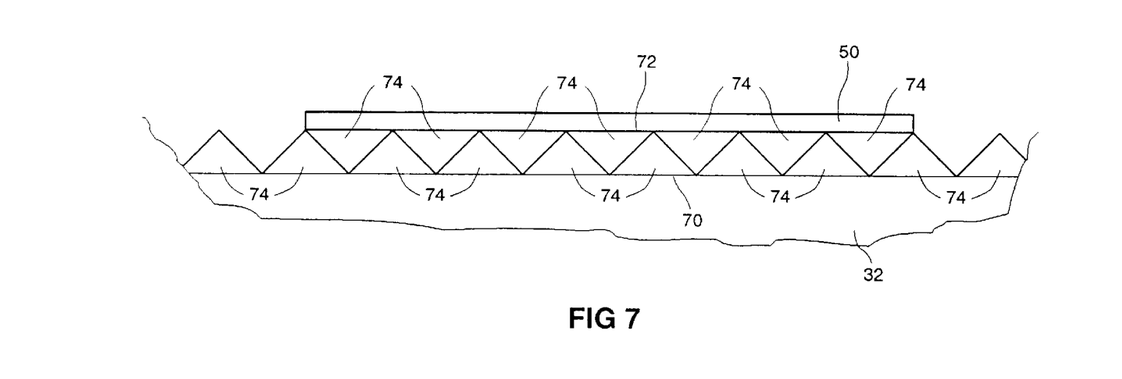
FIG. 7 is a side elevational view of the alternative embodiment computer monitor hood according to FIG. 6.

In an alternative embodiment of the first preferred embodiment, as depicted in FIGS. 6 and 7, the first slip-resistant surface 70 and the second slip-resistant surface 72 each comprise a squared pattern of juxtaposed four sided pyramids 74, as can best be seen in FIG. 6. The pyramids 74 are each shaped so as to cooperatingly interfit one with the other, as can best be seen in FIG. 7.

Figure 8:
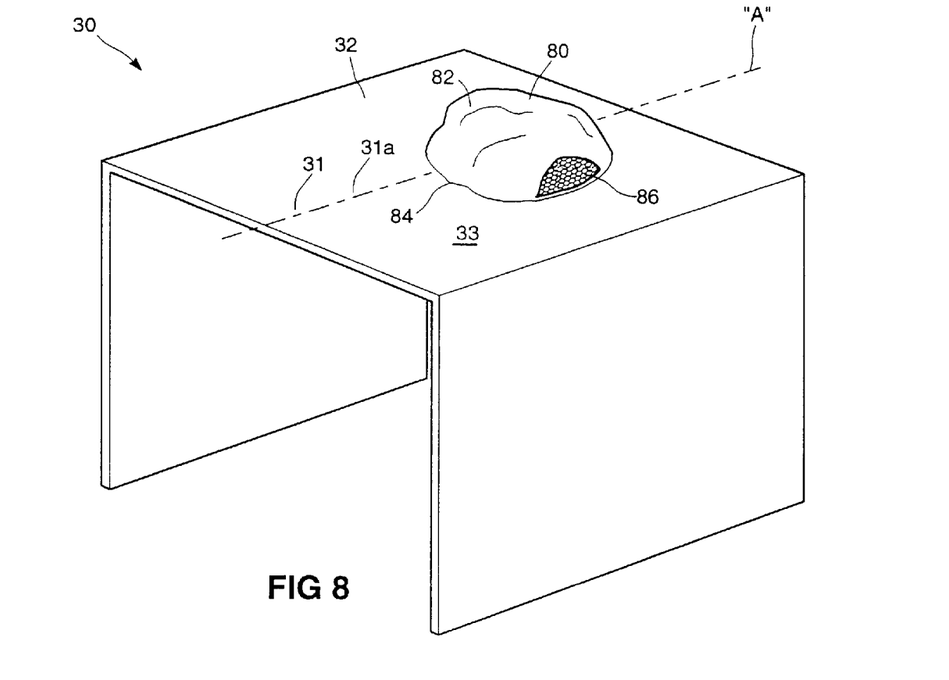
FIG. 8 is a perspective view of another alternative embodiment computer monitor hood.

In another alternative embodiment of the first preferred embodiment, as depicted in FIG. 8, it is contemplated that the counterweight 80 comprises a pliable slip-resistant fabric material outer shell 82 having a second slip-resistant surface 84, and retaining therein an amount of fragmentary material 86, such as dried beans, shot, sand, and so on. The counterweight 80 may be placed in any one of a plurality of front-to-rear positions on the counterweight receiving portion 31 in order to properly balance the computer monitor hood 30 on a computer monitor (not shown), with the first slip-resistant surface 31a and the second slip-resistant surface 84 being in cooperating engagement one with the other, so as to retain the counterweight 80 in any selected position, in a manner analogous to that describe in the first preferred embodiment.

Figure 9:
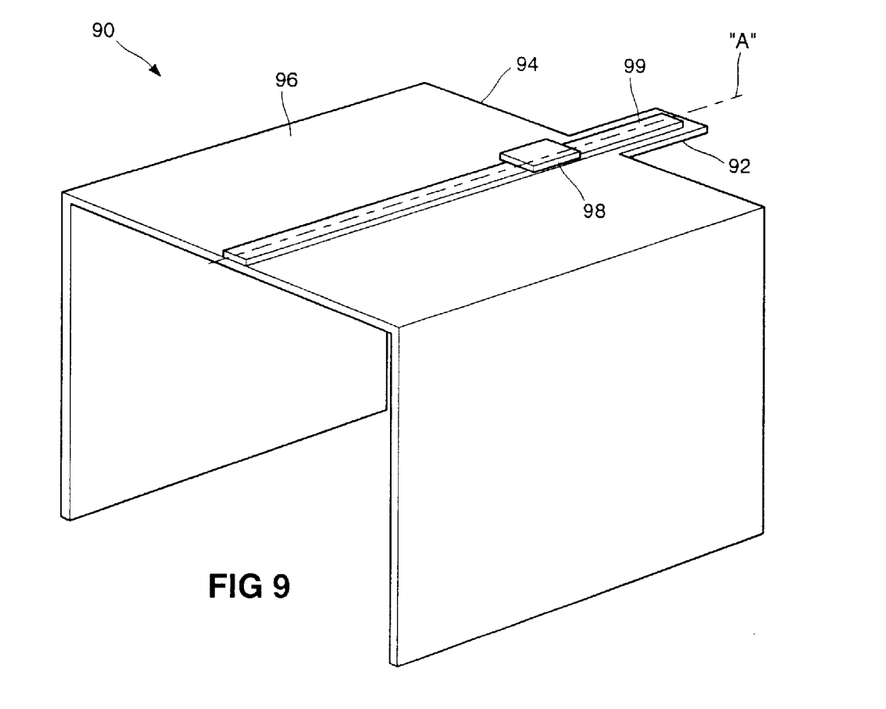
FIG. 9 is a perspective view of yet another alternative embodiment computer monitor hood.

In yet another alternative embodiment of the first preferred embodiment, as depicted in FIG. 9, it is contemplated that a counterweight receiving extension portion 92 extending rearwardly from the rear edge 94 of the top shading panel 96 of the computer monitor hood 90, could be included. The extension portion 92 would be constructed and otherwise adapted to receive the counterweight 98 in selectively movable relation thereon. As depicted, the elongate strip 99 of the one component of the hook and loop fastening system on the top shading panel 96 of the computer monitor hood 90 extends onto the counterweight receiving extension portion 92.

Figure 10:
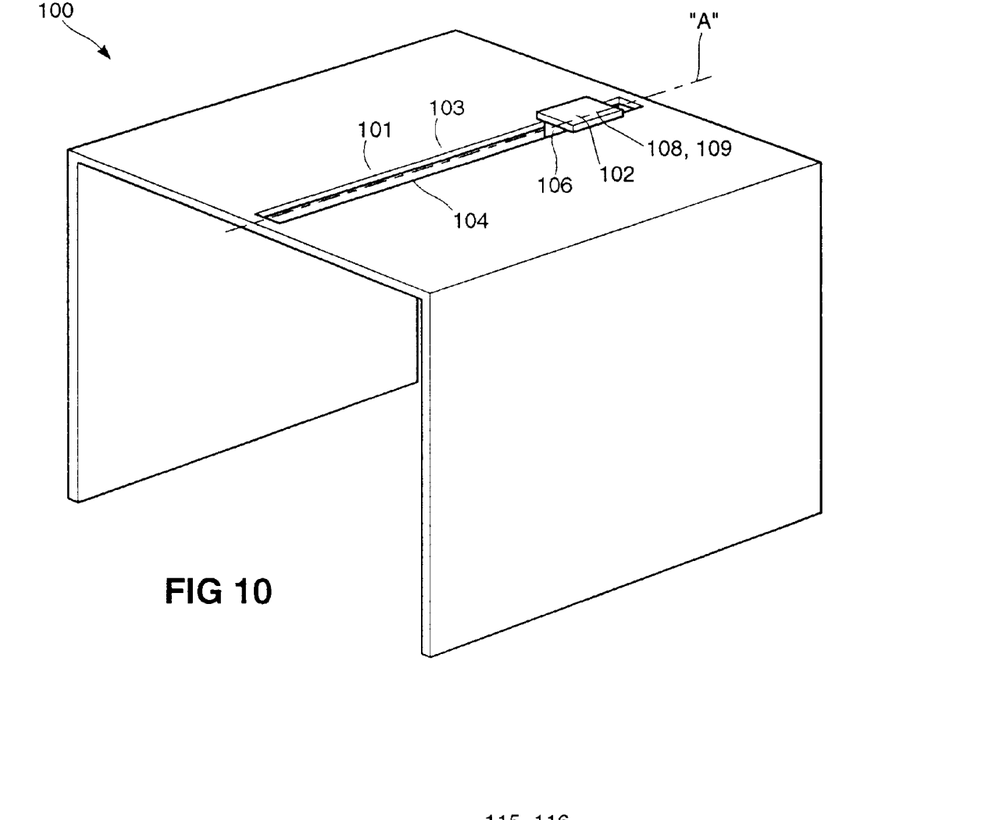
FIG. 10 is a perspective view of yet another alternative embodiment computer monitor hood.

In yet another alternative embodiment of the first preferred embodiment, as is depicted in FIG. 10, it is contemplated that the counterweight 102 of the computer monitor 100 could be operatively mounted for slidable movement within an elongate track 104, which elongate track 104 is generally parallel to the main axis "A" of the computer monitor hood 100. The counterweight 102 has a guide portion 106 that engages the elongate track 104 so as to permit the counterweight 102 to slide therealong and also to preclude the counterweight 102 from being removed from the elongate track 104. The counterweight 102 has a second slip-resistant surface 108 disposed on an undersurface 109, which second slip-resistant surface 108 engages the first slip-resistant surface 101 on the counterweight receiving portion 103, so as to retain the counterweight 102 in any selected place along the elongate track 104.

Figure 11:
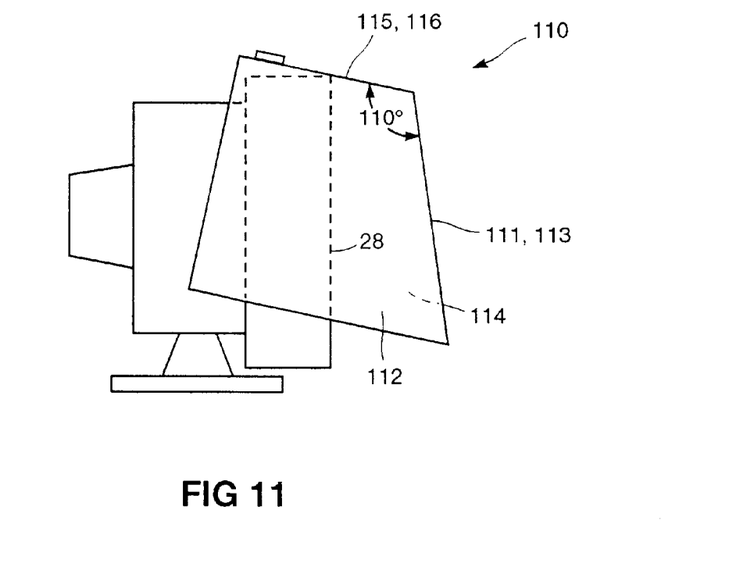
FIG. 11 is a side elevational view of yet another alternative embodiment computer monitor hood.

In still another alternative embodiment of the first preferred embodiment, as is depicted in FIG. 11, it is contemplated that the front edges 111, 113 of the left and right side shading panels 112, 114, respectively, of the computer monitor hood 110 could are oriented at an angle of about 110° with respect to the respective top edges 115, 116 of the respective left and right side shading panels 112, 114. In this manner, the bottom portion of screen 28 of the computer monitor 20 is shaded when the computer monitor hood 110 is tilted downwardly at its front.

In a further alternative embodiment, it is contemplated that the counterweight could be decorative in nature, so as to permit aesthetic enhancement and personalizing of the computer monitor hood of the present invention.

Reference will now be made to FIGS. 12 through 16, which show the second preferred embodiment of the computer monitor hood 120 of the present invention. The computer monitor hood 120 is also for use in conjunction with the computer monitor 20, having a top surface 22, a left side surface 24, a right side surface 26, and a forwardly facing screen 28. The computer monitor hood 120 comprises a top shading panel 122 having an outwardly facing surface 123, a monitor facing surface 124, a front edge 125, a rear edge 126, and substantially parallel left and right side edges 128, 129.

A left side shading panel 140 has an outwardly facing surface 142, a monitor facing surface 144, a front edge 146, a rear edge 148, a top edge 150 and a bottom edge 152. Similarly, a right side shading panel 141 has an outwardly facing surface 143, a monitor facing surface 145, a front edge 147, a rear edge 149, a top edge 151 and a bottom edge 153. The substantially planar left and right side shading panels 140 and 141 are operatively attached at their respective top edges 150, 151 to the top shading panel 122 at the left and right side edges 128, 129 of the top shading panel 122, respectively, so as to each depend from the respective side edge 128, 129 thereof. Preferably, the left and right side shading panels 140 and 141 are disposed in generally vertically oriented relation so as to be juxtaposed to the respective of the left and right side surfaces 24 and 26 of the computer monitor 20.

Figure 12:
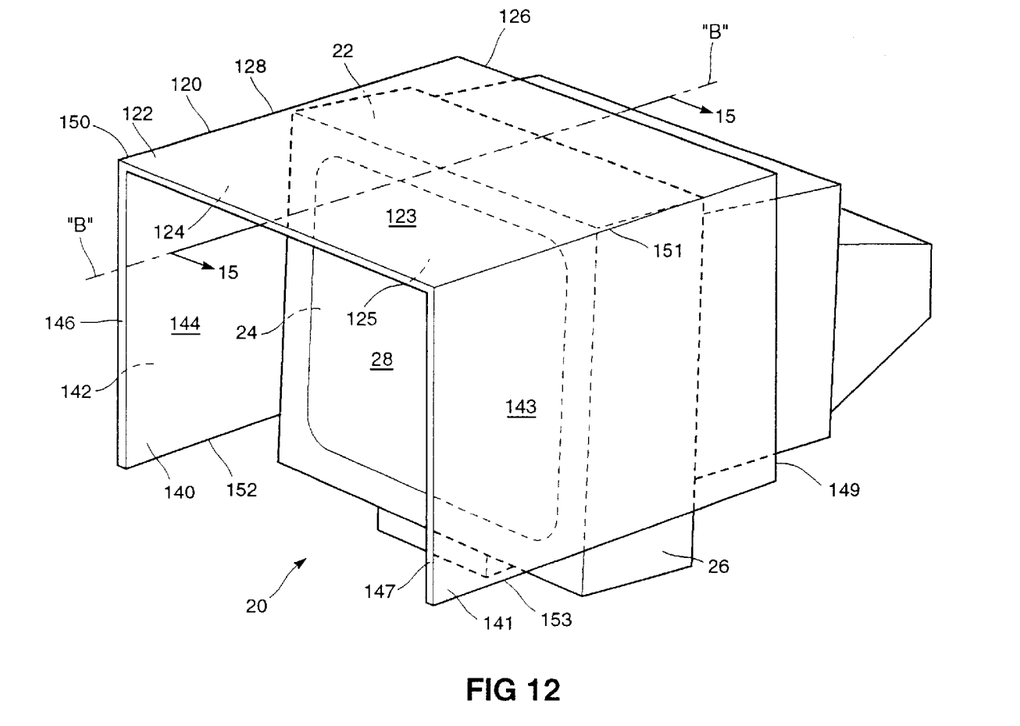
FIG. 12 is a perspective view of a computer monitor with a second preferred embodiment of the computer monitor hood of the present invention in place thereon.
Figures 13, 14:
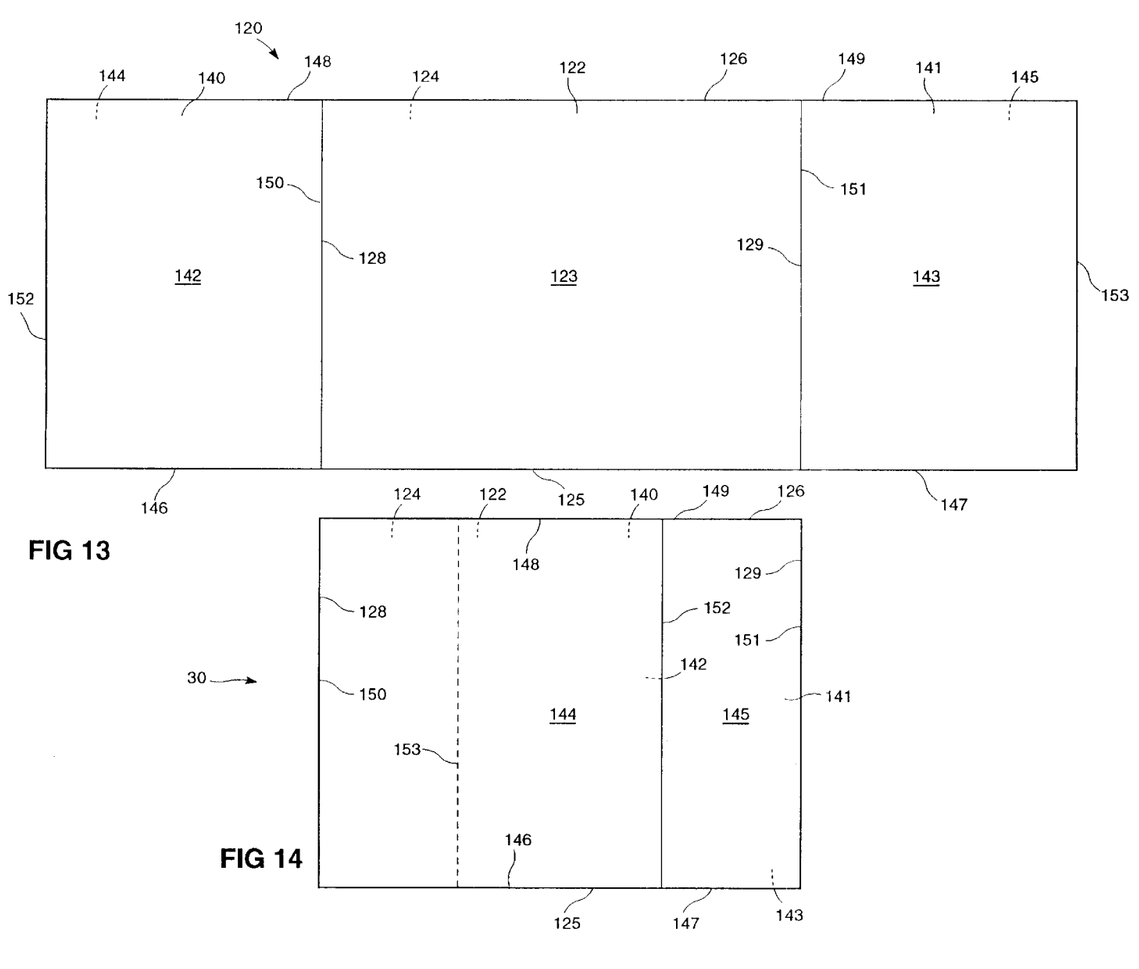
FIG. 13 is a top plan view of the computer monitor hood of FIG. 12 in a flat, open configuration.
FIG. 14 is a top plan view of the computer monitor of FIG. 12 in a folded configuration, adapted for storage or transport.

In order to provide for easy storage and transportation of the computer monitor hood 120, the left side shading panel 140 and the right side shading panel 141 are foldably movable between respective in-use shading positions and respective storage positions. When the computer monitor hood 120 is in use, the left and right side shading panels 140, 141 are disposed in their respective in-use shading positions, as is best seen in FIG. 12. From their respective in-use shading positions, the left and right side shading panels 140, 141 are foldably movable outwardly to intermediate positions, as can be seen in FIG. 13. The left and right side shading panels 140, 141 are then foldably movable over the outwardly facing surface 123 of the top shading panel 122 such that the left and right side shading panels 140, 141 are disposed in their respective storage positions, as can best be seen in FIG. 14.

When the computer monitor hood 120 is in place on the computer monitor 20, and the left side shading panel 140 and the right side shading panel 141 are in their respective in-use shading positions, the front edges 125, 146, 147 of each of the top shading panel 122, the left side shading panel 140, and the right side shading panel 141 are co-planar one front edge with the other.

Figure 15:
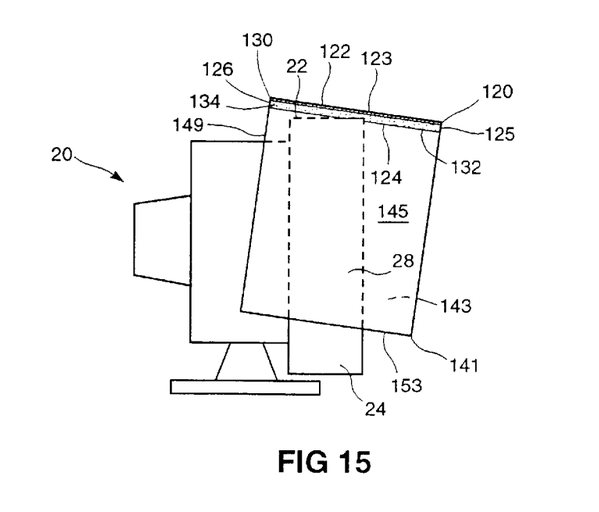
FIG. 15 is a side elevational view of the computer monitor and computer monitor hood of FIG. 12, with the computer monitor hood taken shown in section, taken along section line 15—15 of FIG. 12.
Figure 16:
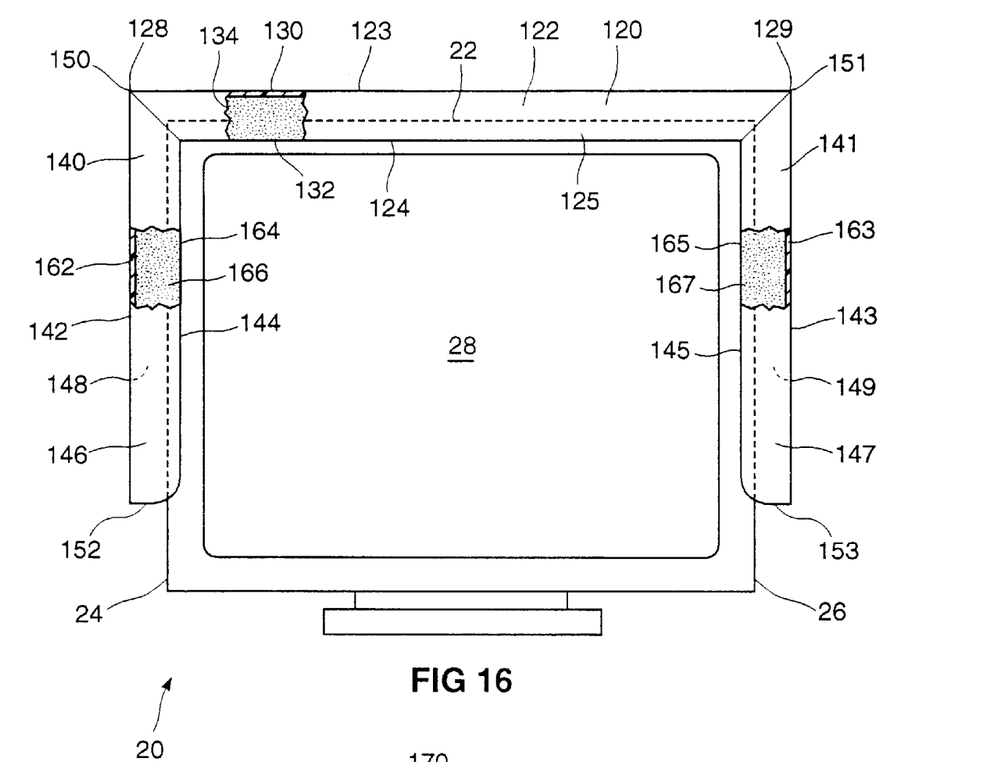
FIG. 16 is a partially cut-away front elevational view of the computer monitor and computer monitor hood of FIG. 12.

The overall form and rigidity of the top shading panel 122 is obtained by inclusion of a substantially rigid external layer 130, made from cardboard, plastic, or the like. A pliant monitor-contacting layer 132, made from a high friction material such as natural or synthetic rubber, or rough cloth material such as felt, among others, comes into intimate contact with a portion of the top surface 22 of the computer monitor 20, when the computer monitor hood 120 is place on the computer monitor 20. An intermediate layer 134 of easily displaceable material is disposed between the substantially rigid external layer 130 and the monitor-contacting layer 132. In the second preferred embodiment as described, the easily displaceable material comprises loose fractional material, preferably fragments of overall dimension less than about 1.0 cm. Various suitable types of materials may be used, including, but not limited to styrofoam, dried beans, thermal-plastics, thermal-setting plastics, wood chips, rice, sand, and stones, among others. Optionally, the left and right side panels 140, 141 may also each include respective substantially rigid external layers 162, 163 a pliant monitor-contacting layers 164, 165 and intermediate layers 166, 167, of easily displaceable material disposed between the respective external layers 162, 163 and the respective monitor-contacting layers 164, 165. Typically, the same materials are used for the layers of the left and right side panels 140, 141 as are used for the top panel 122.

The computer monitor hood 120 has a front-to-rear main axis "B" oriented in generally parallel relation to the parallel left and right side edges 128 and 129 of the top shading panel 122.

As can be best seen in FIG. 15, when the computer monitor hood 120 is in place on the computer monitor 20 such that the monitor facing surface 124 contacts the top surface 22 of the computer monitor 20, a portion of the pliant monitor-contacting layer 132 of the top shading panel 122 rests on a contacted portion of the top surface 22 of the computer monitor 20, an adjacent portion of the intermediate layer 134 of easily displaceable material displaces substantially so as to conform to the shape of the contacted portion of the computer monitor 20. Further, the portion of the pliant monitor-contacting layer 132 substantially conforms to the shape of the contacted portion of the computer monitor 20 such that the contacted portion of thecomputer monitor 20 is received in seated relation by the top shading panel 122.

Also, as can be best seen in FIG. 16, when the computer monitor hood 120 is in place on the computer monitor 20, the monitor facing surfaces 144, 145 of the left and right side shading panels 140, 141 contact the left and right side surfaces 24, 26 respectively. Accordingly, portions of the pliant monitor-contacting layers 164, 165 of the left and right shading panels 140, 141 press against contacted portions of the left side surface 24 and the right side surface 26 of the computer monitor 20. An adjacent portion of each intermediate layer 166, 167 of easily displaceable material displaces substantially so as to conform to the shape of the respective contacted portion of the computer monitor 20. Further, the contacting portions of the pliant monitor-contacting layers 164, 165 substantially conform to the shape of the respective contacted portions of the computer monitor 20 such that the contacted portions of the computer monitor 20 are received in seated relation by the left and right shading panels 140, 141.

In the above described manner, placement of the computer monitor hood 120 is permitted at a selected position on the computer monitor 20 such that the top shading panel 122, the left side shading panel 140, and the right side shading panel 141 each project forwardly from the front of the computer monitor 20, at the respective of the top surface 22, left side 24, and right side surface 26 of the computer monitor 20, so as to shade the screen 28 of the computer monitor 20.

It can be seen that the computer monitor hood 30 would not stay in place on the computer monitor 20, in a manner as described above, without the conforming action of the intermediate layers 134, 166, and 167.

Figure 17:
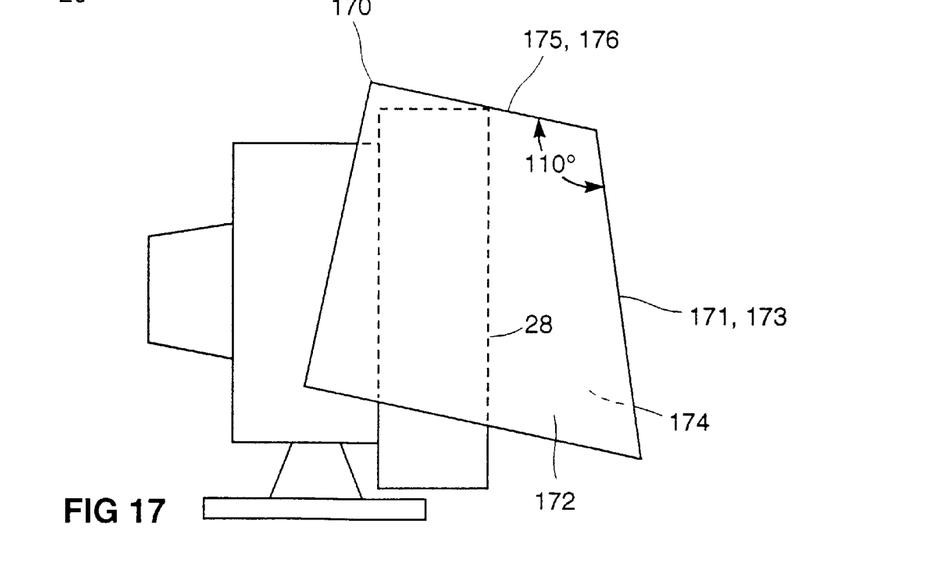
FIG. 17 is a side elevational view of the computer monitor and an alternative embodiment computer monitor hood.

In an alternative embodiment of the second preferred embodiment, as is depicted in FIG. 17, it is contemplated that the front edges 171, 173 of the left and right side shading panels 172, 174, respectively, of the computer monitor hood 170 could are oriented at an angle of about 110° with respect to the respective top edges 175, 176 of the respective left and right side shading panels 172, 174. In this manner, the bottom portion of screen 28 of the computer monitor 20 is shaded when the computer monitor hood 170 is tilted downwardly at its front.

Reference will now be made to FIGS. 18 through 23 which show the third preferred embodiment of the computer monitor hood 180 of the present invention. The computer monitor hood 180 is also for use in conjunction with the computer monitor 20, having a top surface 22, a left side surface 24, a right side surface 26, and a forwardly facing screen 28. The computer monitor hood 180 comprises a top shading panel 182 having an outwardly facing surface 183, a monitor facing surface 184, a front edge 185, a rear edge 186, and substantially parallel left and right side edges 188, 189.

A left side shading panel 190 has an outwardly facing surface 192, a monitor facing surface 194, a front edge 196, a rear edge 198, a top edge 200, and a bottom edge 202. Similarly, a right side shading panel 191 has an outwardly facing surface 193, a monitor facing surface 195, a front edge 197, a rear edge 199, a top edge 201, and a bottom edge 203. The substantially planar left and right side shading panels 190, 191 are operatively attached at their respective top edges 200, 201 to the top shading panel 182 at the left and right side edges 188, 189 of the top shading panel 182, respectively, so as to each depend from the respective side edge 188, 189 thereof. Preferably, the left and right side shading panels 190, 191 are disposed in generally vertically oriented relation so as to be juxtaposed to the respective of the left and right side surfaces 24, 26 of the computer monitor 20.

Figure 18:
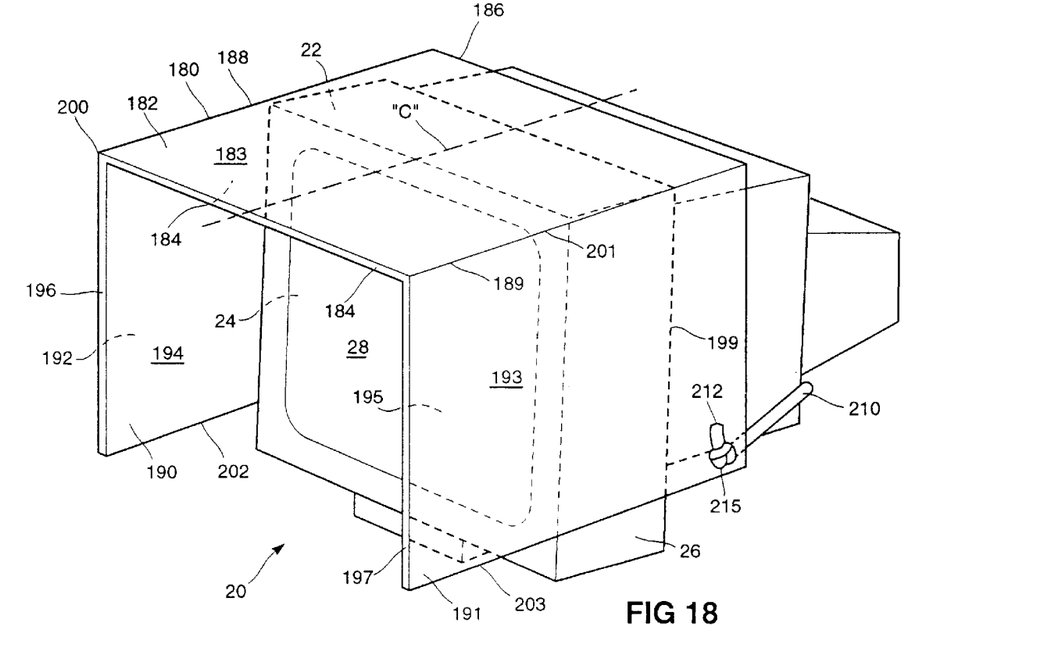
FIG. 18 is a perspective view of a computer monitor with a third preferred embodiment of the computer monitor hood of the present invention in place thereon.
Figures 19, 20:
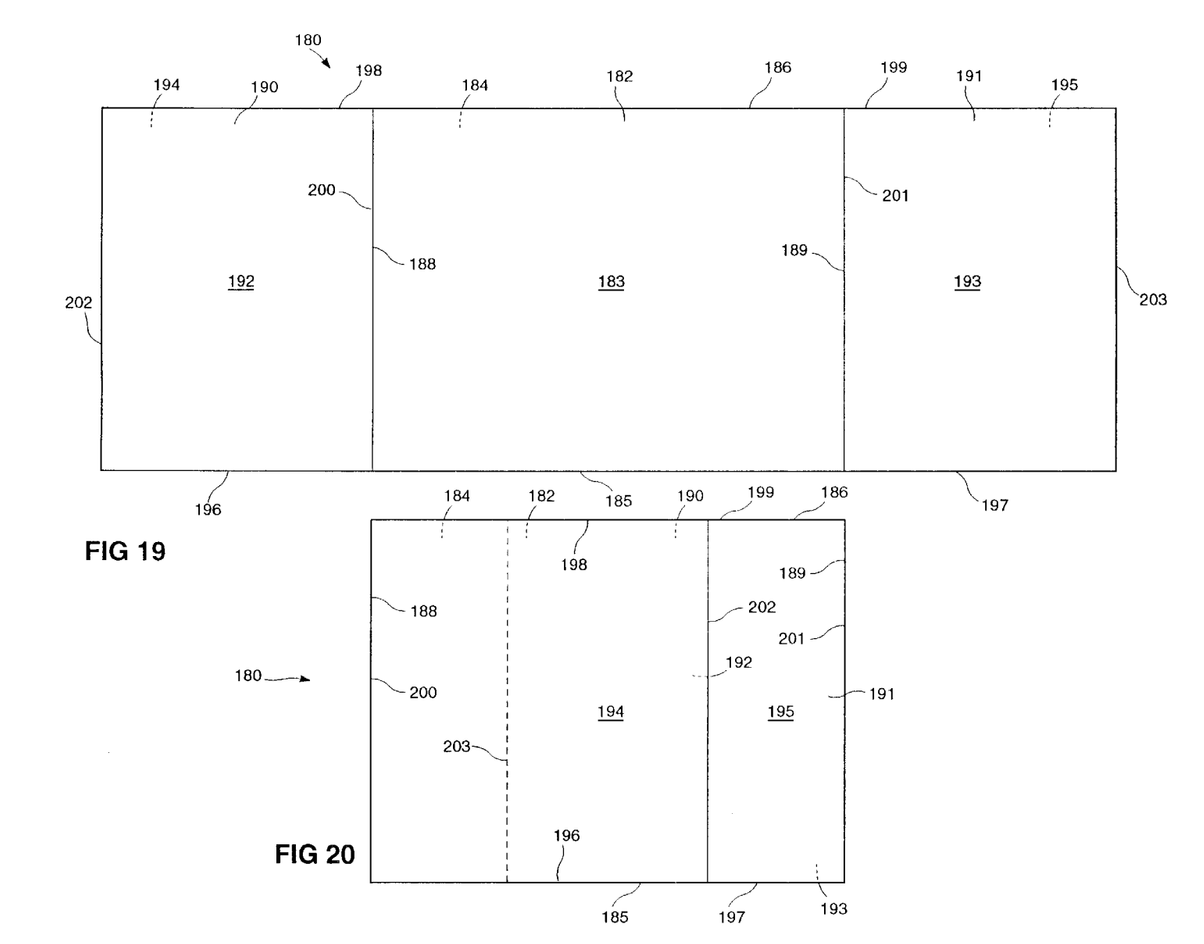
FIG. 19 is a top plan view of the computer monitor hood of FIG. 18 in a flat, open configuration.
FIG. 20 is a top plan view of the computer monitor of FIG. 18 in a folded configuration, adapted for storage or transport.
Figure 21:
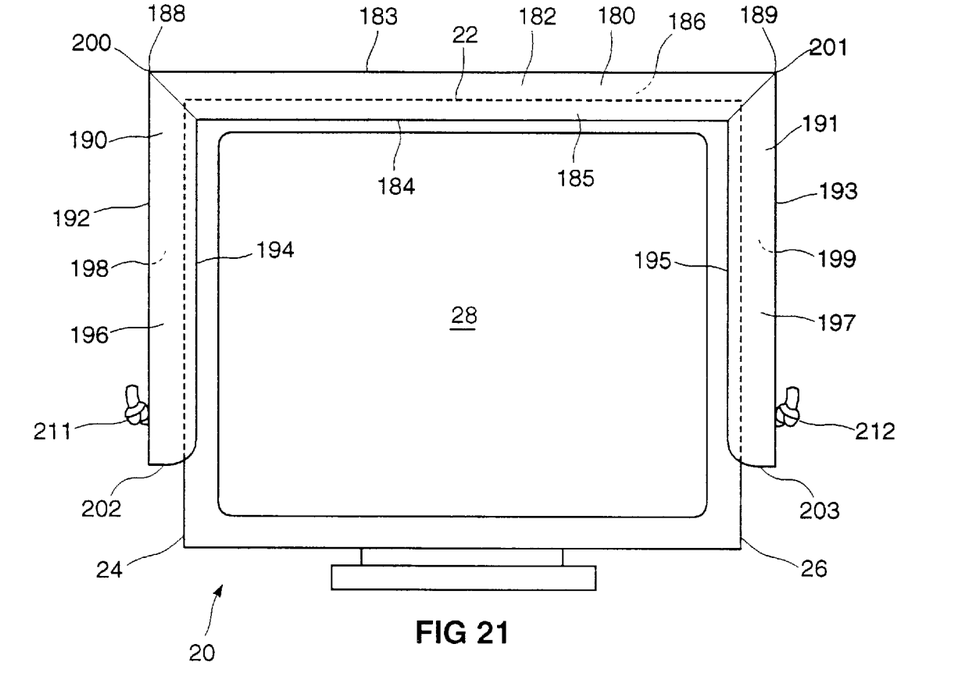
FIG. 21 is a front elevational view of the computer monitor and computer monitor hood of FIG. 18.
Figure 22:
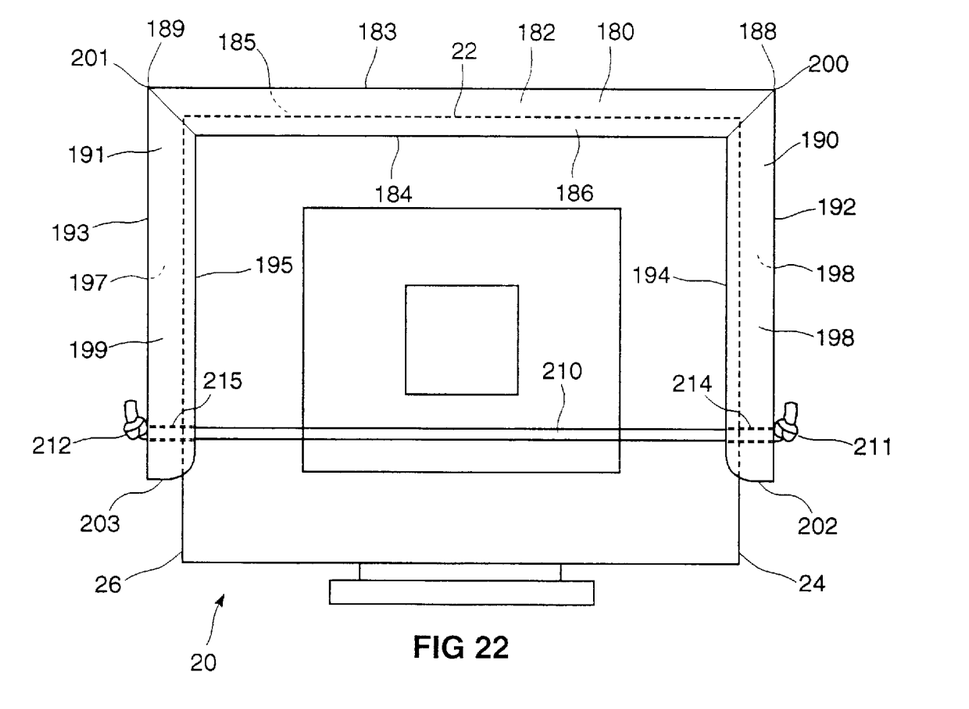
FIG. 22 is a rear elevational view of the computer monitor and computer monitor hood of FIG. 18.
Figure 23:
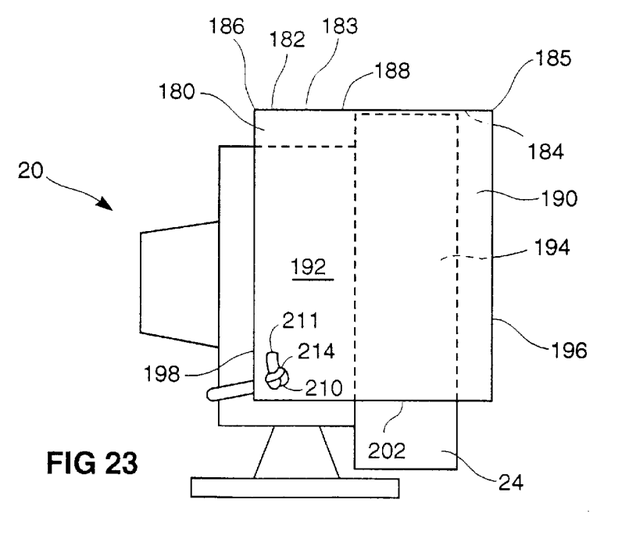
FIG. 23 is a side elevational view of the computer monitor and computer monitor hood of FIG. 18.

In order to provide for easy storage and transportation of the computer monitor hood 180, the left side shading panel 190 and the right side shading panel 191 are foldably movable between respective in-use shading positions and respective storage positions. When the computer monitor hood 180 is in use, the left and right side shading panels 190, 191 are disposed in their respective in-use shading positions, as is best seen in FIG. 18. From their respective in-use shading positions, the left and right side shading panels 190, 191 are foldable movable outwardly to intermediate positions, as can be seen in FIG. 19. The left and right side shading panels 190, 191 are then foldably movable over the outwardly facing surface 183 of the top shading panel 182 such that the left and right side shading panels 190, 191 are disposed in their respective storage positions, as can best be seen in FIG. 20.

A biasing means comprising an elastic member 210, having a first end 211 and a second end 212, is operatively connected between the left side shading panel 190 and the right side shading panel 191. In the embodiment as shown in FIGS. 18 through 23, the elastic member 210 is connected at its first end 211 to the left side shading panel 190 adjacent the rear edge 198 and adjacent the bottom edge 202 through an aperture 214, whereat the first end 211 is tied in a knot. Similarly, the elastic member 210 is connected at its second end 212 to the right side shading panel 191 adjacent its rear edge 199 and its bottom edge 203 through an aperture 215, whereat the second end 212 is tied in a knot. In this manner, the left and right side shading panels 190, 191 are biased towards each other.

When the computer monitor hood 180 is in place on the computer monitor 20, a portion of the monitor facing surface 184 of the top shading panel 182 rests on a contacted portion of the top surface 22 of the computer monitor 20. The elastic member 210 biases the left and right side shading panels 190, 191 into frictional contact with the left and right side surfaces 24, 26 of the computer monitor 20, respectively. In this manner, placement of the computer monitor hood 180 is permitted at a selected position on the computer monitor 20, such that the top shading panel 180, the left side shading panel 190, and the right side shading panel 191 each project forwardly from the front of the computer monitor 20, at the respective of the top surface 22, the left side surface 24, and the right side surface 26 of the computer monitor 20, so as to shade the forwardly facing screen 28 of the computer monitor 20.

It can be seen that the computer monitor hood 180 would not stay in place on the computer monitor 20 in a manner as described above, without being held in place by the left and right side shading panels 190, 191 being biased against the left and right side surfaces 24, 26, respectively, of the computer monitor 20.

In order to help retain the computer monitor hood 180 in place on the computer monitor 20, it is preferable to have the monitor facing surfaces 184, 194, 195 be of a soft, high-friction material, such as sponge rubber or the like.

Figure 24:
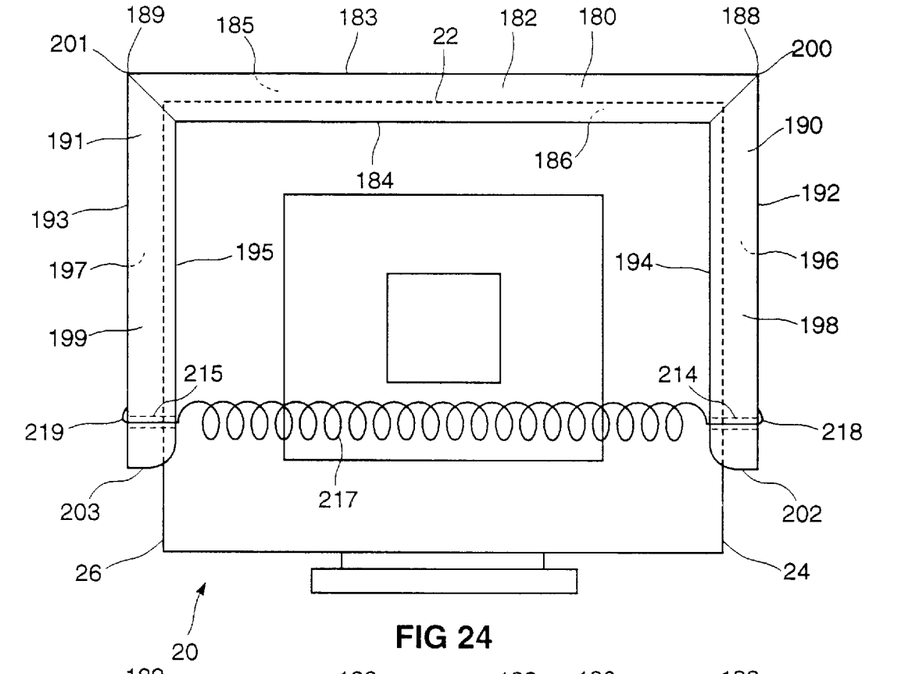
FIG. 24 is a rear elevational view of the computer monitor and an alternative embodiment computer monitor hood.

In an alternative embodiment of the third preferred embodiment, as depicted in FIG. 24, the biasing means comprises a coil spring member 217 having a first end 218 and a second end 219. The coil spring member is connected at its first end 218 to the left side shading panel 190, through aperture 214, and is connected at its second end 219 to the right side shading panel 191, through aperture 215.

Figure 25:
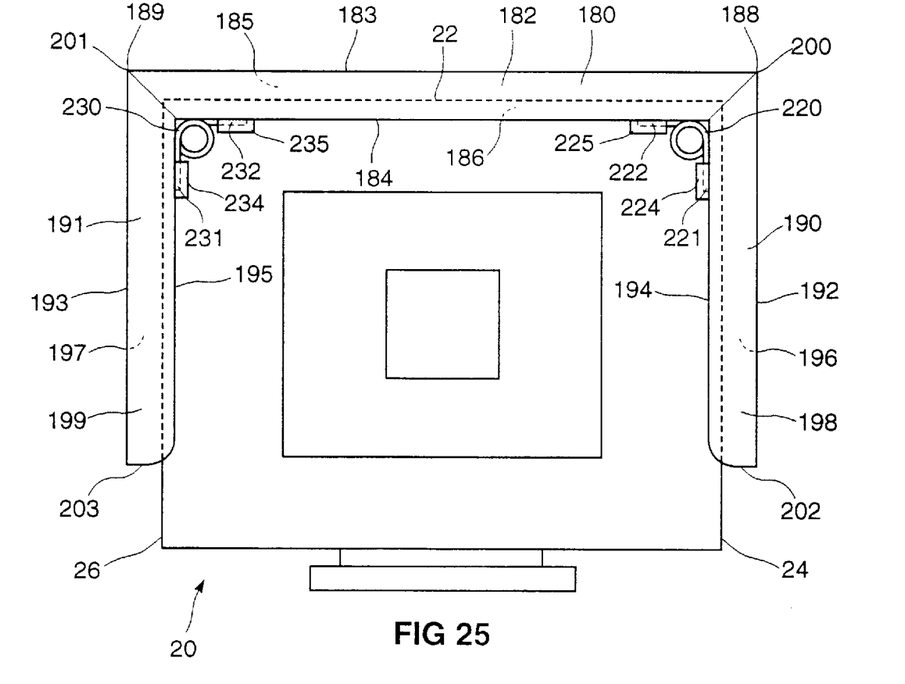
FIG. 25 is a rear elevational view of the computer monitor and another alternative embodiment computer monitor hood.

In another alternative embodiment of the third preferred embodiment, as depicted in FIG. 25, the biasing means comprises a first torsion coil spring 220 and a second torsion coil spring 230. The first torsion coil spring 220 has a first arm portion 221 and a second arm portion 222. Similarly, the second torsion coil spring 230 has a first arm portion 231 and a second arm portion 232. The first arm portion 221 of the first torsion coil spring 220 is inserted into a cooperating socket 224 in the left side shading panel 190 and the second arm portion 222 of the first torsion coil spring 220 is inserted into a cooperating socket 225 in the top shading panel 180. Similarly, the first arm portion 231 of the second torsion coil spring 230 is inserted into a cooperating socket 234 in the right side shading panel 191 and the second arm portion 232 of the second torsion coil spring 230 is inserted into a cooperating socket 235 in the top shading panel 180. The first and second arm portions 221, 222, 231, 232 of the first torsion coil spring 220 and the second torsion coil spring 230 are thereby operatively connected to the appropriate shading panel.

In this above described manner, the left side shading panel 190 and the right side shading panel 191 are each biased towards each other so as to bias the left and right side shading panels 190, 191 into frictional contact with the left side surface 24 and the right side surface 26, respectively, of the computer monitor 20.

Other modifications and alterations may be used in the design and manufacture of the apparatus of the present invention without departing from the spirit and scope of the accompanying claims.

What is claimed is:

1. A computer monitor hood for use in conjunction with a computer monitor having a top surface, left and right side surfaces, and a forwardly facing screen, said computer monitor hood comprising:

a top shading panel having an outwardly facing surface, a monitor facing surface, front, rear, left and right side edges;

left and right side shading panels each having an outwardly facing surface, a monitor facing surface, front, rear, top and bottom edges, and being operatively attached at their respective top edges to said top shading panel at said left and right side edges thereof, respectively, so as to each depend from the respective side edge thereof; and a front-to-rear main axis;

biasing means operatively connected between said left side shading panel and said right side shading panel so as to bias said left and right shading panels toward each other;

wherein said biasing means comprises a first spring member having a first arm portion operatively connected in non-sliding relation to said left side shading panel and a second arm portion operatively connected in non-sliding relation to said top shading panel, and a second spring member having a first arm portion operatively connected in non-sliding relation to said right side shading panel and a second arm portion operatively connected in non-sliding relation to said top shading panel; and whereby, when said computer monitor hood is in place on said computer monitor, a portion of said monitor facing surface of said top shading panel rests on a contacted portion of the top surface of said monitor, and said biasing means biases said left and right side shading panels into frictional contact with said left and right side surfaces, respectively, thereby permitting placement of said computer monitor hood at a selected position on the computer monitor such that said top, left side, and right side shading panels each project forwardly from the front of the computer monitor, at the respective of the top, left side, and right side surfaces of the computer monitor, so as to shade the screen of the computer monitor.

\* \* \* \* \*